Figure 1:
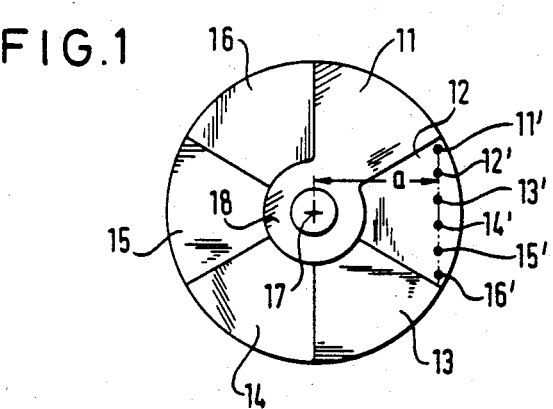

United States Patent [19]

Fetzer

[11] Patent Number: 4,632,500
[45] Date of Patent: Dec. 30, 1986

[54] ROTATABLE MIRROR ARRANGEMENT FOR GENERATING A SCANNING BEAM WHICH IS DISPLACED IN STEPS PARALLEL TO ITSELF

[75] Inventor: Günter Fetzer, Gundelfingen, Fed. Rep. of Germany

[73] Assignee: Erwin Sick GmbH, Waldkirch, Fed. Rep. of Germany

[21] Appl. No.: 628,484

[22] Filed: Jul. 6, 1984

[30] Foreign Application Priority Data

Jul. 8, 1983 [DE] Fed. Rep. of Germany ....... 3324746

[51] Int. Cl.$^4$ .............................................. G02B 26/10
[52] U.S. Cl. .................................................. 350/6.5
[58] Field of Search ................ 350/6.4, 273, 274, 486, 350/6.5

[56] References Cited

U.S. PATENT DOCUMENTS 3,985,420 10/1976 Grose ................................. 350/486
4,118,619 10/1978 McArthur et al. .
4,367,014 1/1983 Howden .
4,519,680 5/1985 Grollimund ........................ 350/486
4,544,228 10/1985 Rando .................................. 350/6.4

FOREIGN PATENT DOCUMENTS 2828754 6/1978 Fed. Rep. of Germany .
3125189 3/1983 Fed. Rep. of Germany .

Primary Examiner—John K. Corbin
Assistant Examiner—Rebecca D. Gass
Attorney, Agent, or Firm—Merchant, Gould, Smith, Edell, Welter & Schmidt

[57] ABSTRACT

In a rotatable mirror arrangement for generating a scanning beam which is displaced in steps parallel to itself a plurality of plane mirrors (11 to 16) are arranged in a helically displaced arrangement around a body (18) rotatable about an axis of rotation (17). The plane mirrors, which are of the same size are illuminated at an angle $\alpha$ by a light beam (19). The light beam (19) extends in a plane which contains the scanning beam and which lies parallel to but is displaced from the axis of rotation (17).

7 Claims, 5 Drawing Figures

ROTATABLE MIRROR ARRANGEMENT FOR GENERATING A SCANNING BEAM WHICH IS DISPLACED IN STEPS PARALLEL TO ITSELF

The invention relates to a rotatable mirror arrangement for generating a scanning beam which is displaced parallel to itself. In one known arrangement of this kind (DE-OS No. 31 25 189) the rotatable mirror arrangement is a so-called mirror wheel having a plurality of flat mirror surfaces arranged in polygonal manner around its periphery. On rotating a mirror wheel of this kind an incident laser beam is reflected in such a manner that it generally executes a continuous sector-like movement. It is also known in the optical art to place a mirror wheel of the above described kind at the focus of a concave strip-like mirror. In this way the light beam, which is reflected at the mirror wheel and which executes the abovementioned continuous sector-like movement, is converted by the concave mirror into a scanning beam which is continuously displaced parallel to itself.

Applications however sometimes arise in which it is desirable to have a scanning beam which is not displaced continuously parallel to itself, but which is instead displaced in sequential parallel jumps relative to itself. In such arrangements it is normally desirable for the scanning beam to dwell in a fixed position for a certain period of time after each jump.

Several rotatable mirror arrangements for this purpose are disclosed in German Offenlegungsschrift No. 28 28 754. Most of these arrangements are relatively complex, would be very expensive to produce, and suffer from restrictions with regard to the speed of scanning and problems with regard to light-loss due to the multiple reflections which occur in most embodiments. The scanning light beams produced by the various embodiments disclosed in German Offenlegungsschrift No. 28 28 754 are intended to produce a regular array of small holes in cigarette paper.

Figure 5:
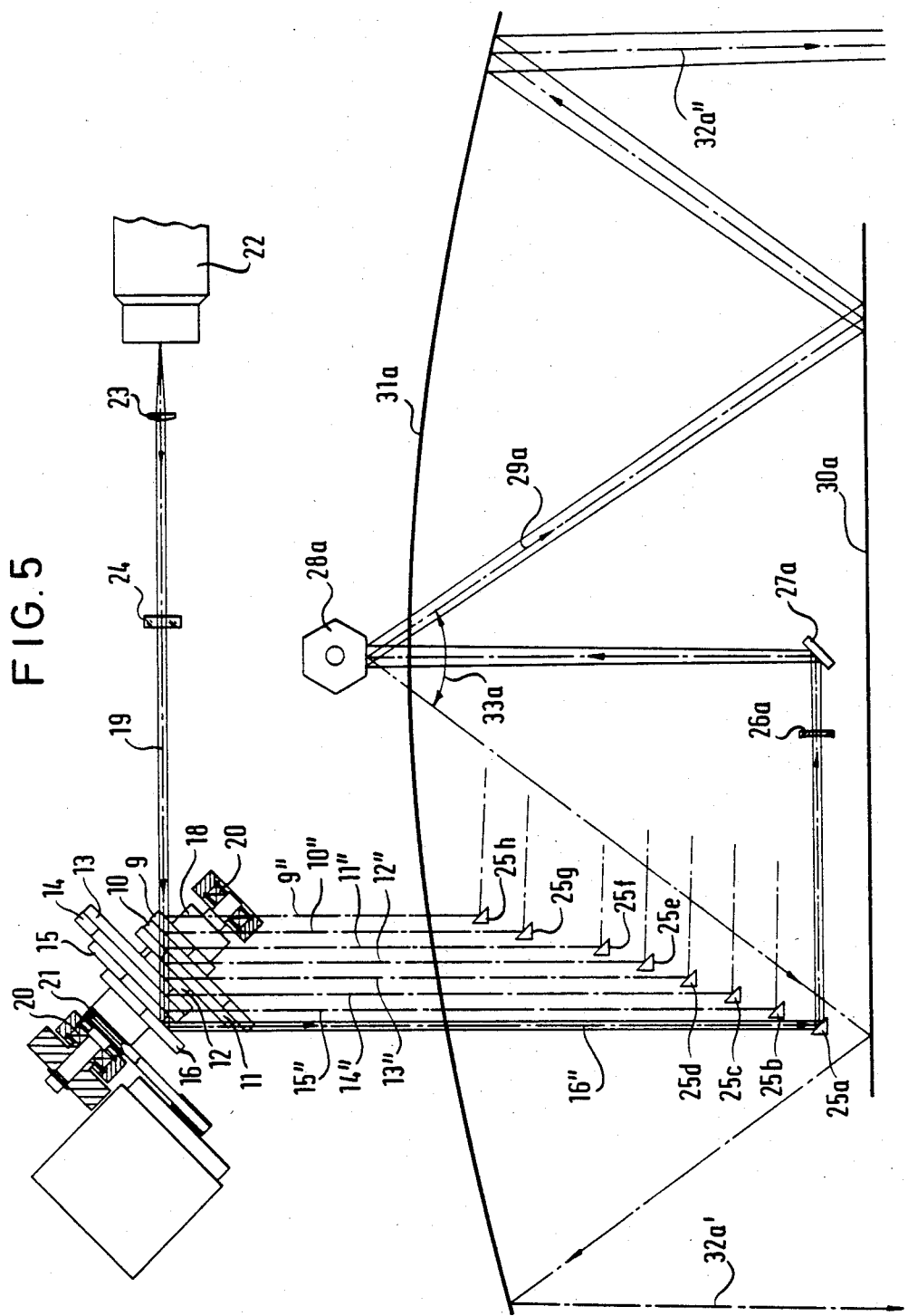

The simplest arrangement shown in German Offenlegungsschrift No. 28 28 754 is that shown in FIGS. 5 and 6.

In this embodiment a plurality of disks of sequentially increasing diameter are arranged one behind the other on a rotatable body. Each of the disks has several mirror surfaces provided thereon adjacent its periphery. Transparent regions or gaps are provided between the individual mirror surfaces on each disk. A laser light beam, which lies in a common plane with the axis of rotation of the rotatable mirror arrangement, extends at an angle of approximately 45° to the axis of rotation thereof. The reflective surfaces on the sequential disks are peripherally staggered in such a way that, after the laser light beam has been reflected by a mirror surface on the first disk, this mirror surface is followed by an aperture which allows the laser beam to fall onto the next mirror surface on the next succeeding disk and so on. The reflections from the mirror surfaces on the succeeding disks result in the production of a scanning beam which is displaced parallel to itself jumpwise in the desired manner. Because the angular speed of rotation of the rotatable mirror arrangement has to be constant, and because the disks are of different diameters, the mirror surfaces on the first (small diameter) disk have to be shorter in length than the mirror surfaces on succeeding disks. In fact the length of all the mirror surfaces have to be carefully sized so that they are inversely proportional to the peripheral speed of the respective disk at the point of impact of the laser beam. If this were not so then the dwell time of the scanning beam in each of its displaced positions would not be constant.

It will be seen from the foregoing that the rotatable mirror arrangement is relatively complicated and expensive because each of the disks of the rotatable mirror arrangement has to be separately constructed and designed.

A further disadvantage, which is critical for some applications, arises due to the finite cross-sectional size of the laser light beam. Because the peripheral speed of the smallest diameter disk is relatively low when compared with the speed of the largest diameter disk it intersects the light beam relatively slowly and thus the intensity of the scanning beam has a finite rise time, and equally a finite fade away time as the training edge of the mirror surfaces leaves the light beam. Thus the flanks of the light pulse produced by the first mirror surface are not very steep. The flanks of the light pulse produced by the mirror surface on the largest diameter disk are however comparatively steep.

It is the principal object of the present invention, starting from the known arrangement of German Offenlegungsschrift No. 28 28 754, to produce a very much simpler rotatable mirror arrangement which is less expensive and complicated to manufacture, which is reliable, even at relatively high speeds of rotation and which produces uniform light pulses all having flanks of comparable steepness.

In order to satisfy this object there is provided, in accordance with the present invention, a rotatable mirror arrangement for generating a scanning beam which is displaced parallel to itself, the apparatus comprising a plurality of mirror surfaces which are arranged on a body rotatable about an axis and which reflect a beam of light one after the other during the rotation of the rotatable body, wherein the mirror surfaces extend perpendicular to the axis of rotation of the rotatable body and are arranged in an angularly displaced manner around the rotatable body, wherein the beam of light impinges on the mirror surfaces radially removed from the axis of rotation and at an angle α such that, for one complete rotation of the rotatable body, each mirror surface is only hit once by the light beam for a finite angle of rotation, and wherein the beam of light extends at an angle to the axis of rotation, characterised in that the light beam extends in a plane which contains the scanning beam and lies parallel to but displaced from the axis of rotation; and in that the individual mirror surfaces are of the same size and arranged in a helically displaced manner around the axis of rotation.

Because the light beam extends in a plane which lies parallel to but displaced from the axis of rotation the dwell time during which the light beam strikes each mirror surface can be kept constant, largely irrespective of the axial separation between the individual mirror surfaces, providing the mirror surfaces are all of the same size. However, this means that the mirror surfaces can now all be made of the same size and therefore that manufacture is considerably simplified because, for example with a rotatable mirror arrangement intended to split an incoming beam of light into six distinct outlet beams one needs six identical mirror elements rather than six differently sized and differently dimensioned disks, which also have to be carefully matched one to the other. It will be appreciated that this results in a substantial manufacturing advantage. Furthermore, it keeps the overall diameter of the rotatable mirror arrangement within reasonable limits, and thus enables the scanning arrangement to be driven at high speeds without having to worry unduly about centrifugal speed limitations.

Furthermore, the beam of light is intersected by the edge of each mirror surface in exactly the same way. This means that the flanks of each light pulse are substantially identical which can be advantageous under certain circumstances.

Thus the selection of the special geometry proposed herein enables a substantial simplification and improvement over known rotating mirror arrangements used for the same purpose.

Thus, by reason of the arrangement of the invention, a light beam which is incident on one of the mirror surfaces will be reflected in one and the same direction for as long as that mirror remains in the light beam. If, after a specified finite angle of rotation, the light beam falls on a mirror which is peripherally and axially displaced relative to the previous mirror, then the reflected light beam is displaced parallel to the light beam reflected by the preceding mirror. The reflected light beam now remains in this displaced position until it falls on a further axially and peripherally displaced mirror whereupon a new, step-like lateral displacement of the reflected beam occurs, and indeed to a new position which it retains as long as the light beam continues to fall on the associated mirror.

It is preferable for from 6 to 10 and in particular for 8 mirrors to be arranged around the periphery of the rotating body.

Each axially displaced mirror surface should be spaced from the preceding mirror surface by the same axial amount. Furthermore, it is expedient if the axial spacing of the mirror surfaces is substantially the same as the thickness of the mirrors. In other words the mirrors should be packed together as closely as possible on the rotatable body, thus resulting in a compact space saving arrangement. In order, in particular in this case, to obtain a lateral displacement of the reflected laser beam which is as large as possible when the laser beam falls on sequential mirrors, the light beam should as far as possible strike the mirrors at an angle of approximately 45°. Moreover, the light beam should strike the mirrors at as large a radial distance as possible, in order to exploit the minor surface that is available and to ensure steep flanks of the individual pulses.

Each mirror should preferably be spaced by the same angular amount from the immediately preceding axially displaced mirror.

The mirrors can conveniently have sectorial shape or be of rectangular shape.

As a result of the invention the time required for the laser light beam to jump from one mirror to the following mirror can be kept relatively small in comparison to the dwell time on a rotating mirror surface. It is straight-forwardly possible to realise ratios of transition time to dwell time in the range from 1 to 3 to 1 to 10. The ratio of transition time to dwell time depends on the ratio of the diameter of the light beam to the size of the mirror segment. This ratio can thus be favourably influenced by selecting an appropriately fine laser light beam.

The rotatable mirror arrangement of the invention can be used to special advantage as the master mirror wheel in a scanning apparatus in accordance with German Offenlegungsschrift No. 31 25 189.

If a customary mirror wheel were used as a master mirror wheel then the scanning beam from the master mirror wheel would be displaced continuously parallel to itself, which would be undesirable. As a result of the arrangement in accordance with the invention each slave mirror wheel can be illuminated over a predetermined period by a stationary laser light beam before this light beam jumps, after the predetermined time, to the next slave mirror wheel where it likewise rests for the predetermined time.

The preferred application of the invention is in particular characterised in that the axis of rotation of the rotatable body is arranged at an angle of 45° to the laser beam and deflects this laser light beam in jump-like steps through 90° to deflecting mirrors which are displaced in the direction of the impinging light beams, and which deflect the light beams, via further deflecting mirrors, to further slave mirror wheels.

Figure 2:
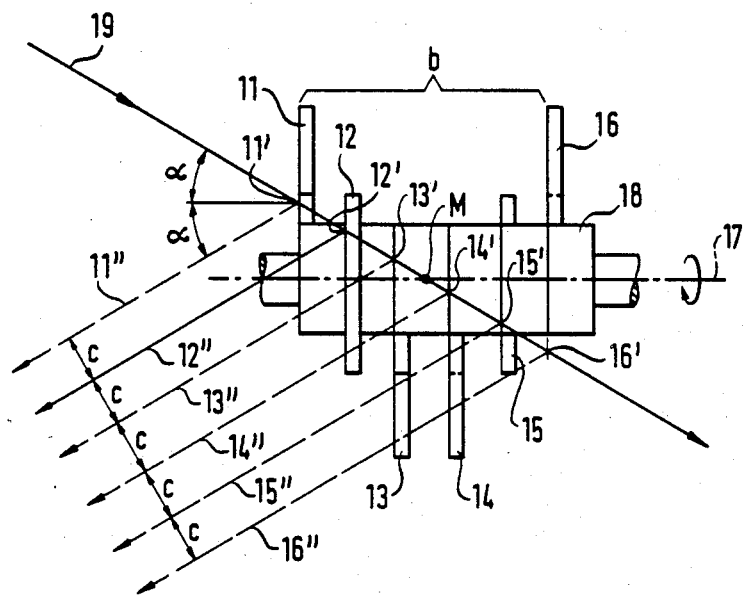
Figure 3:
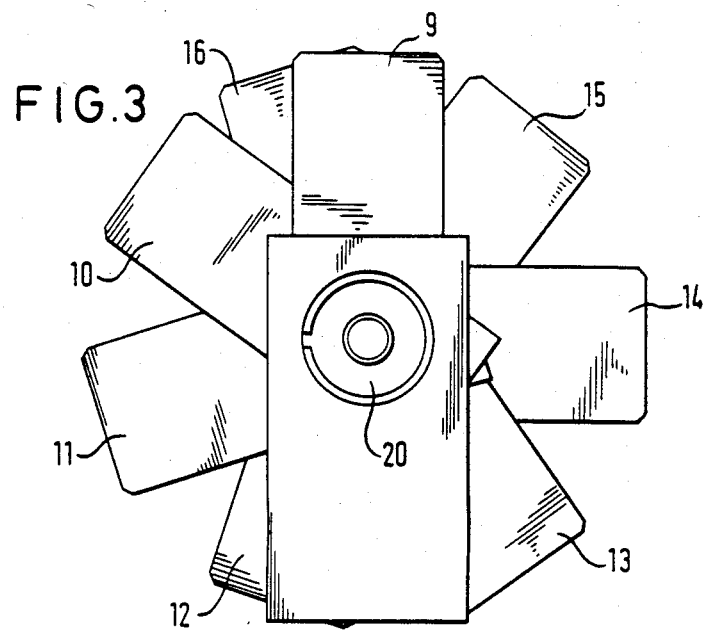
Figure 4:
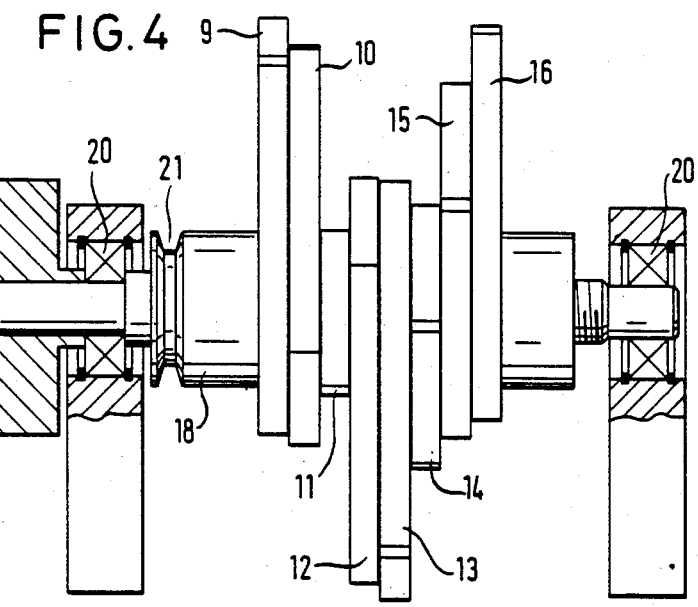

The invention will now be described in the following by way of example only and with reference to the drawing which show:

FIG. 1 an axial view of a rotatable mirror arrangement in accordance with the invention, FIG. 2 a side view of the arrangement of FIG. 1 seen from the right illustrating the incident light beam and the reflected light beams, FIG. 3 an axial view analogous to FIG. 1 of a practical constructional embodiment of the rotatable mirror arrangement, FIG. 4 a side view of the rotatable mirror arrangement of FIG. 3, and FIG. 5 an application of the rotatable mirror arrangement of the invention in a scanning apparatus of the kind described in German Offenlegungsschrift No. 31 25 189.

As seen in FIGS. 1 and 2 sector-like plane mirrors 11, 12, 13, 14, 15, 16 are arranged on a body 18 which is continuously rotatable at constant speed about an axis of rotation 17. The plane mirrors 11, 12, 13, 14 are arranged at right angles to the axis of rotation 17 and are displaced around the axis in a helical manner. All sequential mirrors have the same axial and peripheral displacement. The mirrors are of identical construction. The sectorlike plane mirrors 11, 12, 13, 14, 15, 16 overlap each other and consequently extend together over a peripheral range of more than 360°. This overlapping can be clearly seen from FIG. 3 which will be described later. The mirrors 11 to 16 thus jointly extend, in the view of FIG. 1, over a peripheral extent of 360°.

As seen in FIG. 2 a laser light beam 19 falls on this rotatable mirror arrangement at an angle $\alpha$ of approximately 30°. As seen in FIG. 1 the laser light beam impinges on the rotatable mirror arrangement at a lateral distance a from the axis of rotation 17. In the vertical direction the laser light beam 19 is so arranged that it passes, in the side view of FIG. 2, through the axial center M of the longitudinal extent b of the rotatable mirror arrangement. The mentioned overlapping depends on the angle $\alpha$. If no overlapping was present the beam 19 would pass between the mirror elements without being deflected during the transition from one plane mirror to the next.

The plane in which the incident light beam 19 lies can be thought of as the plane of FIG. 2 of the drawing, i.e. a plane which includes the scanning beam 11″, 12″, 13″, 14″, 15″, 16″. This plane extends perpendicular to the plane of FIG. 1 (and embraces the points 11′, 12′ . . . 16′ as schematically illustrated in FIG. 1). Because of the above arrangement the light beam 19 impinges, depending on the rotational position of the rotatable mirror arrangement of FIGS. 1 and 2, at the points 11', 12', 13', 14', 15', 16' on the mirror surfaces of the mirrors 11, 12, 13, 14, 15 and 16.

Thus light beams 11", 12", 13", 14", 15", 16" are reflected out of the light beam 19. In FIGS. 1 and 2 the rotatable body 18 is shown in an angular position such that the light beam 19 is reflected at the second mirror 12 at the position 12' and results in a reflected beam 12". The remaining reflected light beams 11', 13', 14', 15' and 16' which are displaced in steps are indicated in FIG. 2 in broken lines.

By continuous rotation of the rotatable body 18 a scanning beam can be generated which is in each case displaced parallel to itself by the same amount c.

So far as possible the angle of incidence of the light beam 19 on the individual mirror surfaces should amount to 45°.

It is interesting to note from FIG. 1 that the laser beam 19 does not actually strike each mirror segment at exactly the same radial distance from the axis of rotation 17. Thus the actual peripheral distances swept out on the mirror surfaces due to rotation about the axis 17 are not exactly constant. Nevertheless, this does not affect the total dwell time of the light beam on each mirror surface because the angular speed of the sector-like mirror surfaces is constant. This is an important recognition underlying the present invention.

Equally FIG. 1 makes it clear why it is preferred for the light beam 19 to cross the axis of rotation 17 at the point M shown in FIG. 2. This namely results in the points of incidence of the light beam 19 on the mirror surfaces falling at the points 11', 12', 13', 14', 15' and 16' shown in FIG. 1, which is a symmetrical situation allowing the distance a to be maximised and thus allowing the flanks of the individual light pulses of the light beams 11', 12', 13', 14', 15' to be as steep as possible.

FIGS. 3 and 4 show an alternative embodiment in which 8 rectangular mirrors 9 to 16 are arranged tightly packed in a helical manner around the periphery of the rotatable body 18.

The rotatable body is supported at both ends in bearings 20 and can for example be driven by a V-belt pulley 21 so that it executes a continuous rotational movement.

In FIG. 5 the same reference numerals are used to designate the same elements as in the previously described embodiments.

A laser light beam 19 passes from a laser 22 via a beam widening optical system 23, 24 at an angle of 45° onto the rotatable mirror arrangement consisting, in accordance with the invention, of the mirrors 9 to 16. These mirrors deflect the laser beam through 90° into a vertical direction. FIG. 5 illustrates the reflection at the last mirror 16. The remaining mirrors 9 to 15 are displaced in helical form relative to the mirror 16 in such a way that they do not hinder the passage of the laser beam 19 to the mirror 16. The deflected laser beam 16" then impinges on a deflecting mirror 25a and is directed from this deflecting mirror 25a, if required via a further optical correction element 26a (for example a lens) to a further deflecting mirror 27a which guides the light beam to a slave mirror wheel 28a which, in this embodiment, rotates substantially faster than the rotatable mirror arrangement in accordance with the invention. The slave mirror wheel 28a produces a sector-like scanning light beam 29a which executes a periodically repeating scanning movement within the sector 33a. The sector-like light beam falls on a strip-like plane mirror 30a which deflects the light beam to a concave mirror 31a which is only schematically illustrated. The concave mirror 31a converts the scanning beam which is executing a sector-like movement into a scanning beam 32a which is continuously displaced parallel to itself across the region between the limits 32a' and 32a" in cycles which follow one another. The scanning light beam 32 thus scans one section of the width of a material web as described in DE-OS No. 31 25 189 in order to look for faults therein. The receiving arrangement for the light which passes through the broad web 30a (for example a carpet web) is not shown in FIG. 5, it can however be constructed in the manner described in German Offenlegungsschrift No. 31 25 189.

Not shown in the drawing of FIG. 5 are further slave mirror wheels which, together with associated mirror arrangements, lie in a row to the right hand side of the slave mirror wheel 28a.

On continuous further rotation of the rotatable body 18 the remaining mirrors 9 to 15 enter in turn into the light beam 19 which results in step-wise laterally displaced reflected beams 15", 14", 13", 12", 11", 10" and 9" being formed. These beams are deflected, in analogous manner to that described above with reference to the reflected beam 19", through 90° at deflecting mirrors 25b, 25c, 25d, 25e, 25f, 25g and 25h respectively which are displaced relative to one another in the direction of these beams. The light beams deflected at the mirrors 25 pass the above described slave mirror wheel or scanning arrangement and reach the further above-mentioned slave mirror wheel or scanning arrangements to the right of the illustrated slave mirror wheel 28a. As previously mentioned these further slave mirror wheel or scanning arrangements are of the same construction, and each gives rise to a corresponding further scanning cycle identical to that described with reference to the slave mirror arrangement 28a. In operation the reflected laser beam jumps after each predetermined dwell time to the next position and so on. During the dwell time of the reflected laser light beam on one mirror surface of the rotatable mirror arrangement of the invention the associated slave mirror wheel, for example 28a complete at least one complete scan.

Thus, whereas the rotatable mirror arrangement of the invention is used to generate a scanning beam which is displaced laterally in jumps the mirror wheels produce a customary, sector-like, continuous scanning movement of a scanning beam.

It should also be pointed out that the strip-like mirror 30a is displaced forwardly relative to the slave mirror wheel 28a by a small distance and that the concave mirror 31a lies by twice this distance in front of the mirror wheel 28a in the illustration of FIG. 5. In this way the scanning beam 32a can pass by the strip-like mirror 30a and reach the part of the web which is to be scanned. In other words the beam path is folded.

If the distance a of the laser beam 19 from the axis of rotation 17 is made smaller then the angle α can be made correspondingly larger.

I claim:

1. A rotary mirror assembly for dividing a generally continuous incident beam of light into a plurality of parallel spaced apart scanning beams; said assembly comprising:
   (a) a rotary body mounted for rotation about an axis of rotation;

(b) a plurality of mirrors secured to said body and projecting radially therefrom with each of said mirrors presenting a mirror surface generally perpendicular to said axis of rotation; said mirrors arranged on said body with adjacent mirrors displaced axially and angularly; each of said mirrors being axially spaced from adjacent mirrors by the same predetermined axial spacing; each of said mirrors covering only an angular segment of a plane perpendicular to said axis with adjacent mirrors being angularly displaced for a light beam impinging a mirror to leave said mirror as said body rotates and impinge an adjacent mirror;

(c) means for rotating rotating said body about said axis;

(d) light beam generating means for projecting a generally continuous incident beam of light in a constant straight line with said beam reflecting off of each of said mirror surfaces as said body rotates with reflected light from each of said mirror surfaces comprising said plurality of parallel spaced-apart scanning beams; and (e) said light beam generating means disposed for said incident beam to project at an angle with said rotational axis and to impinge upon only one mirror of said plurality of mirrors at a time near a radially outer edge of said one mirror and with said incident beam and reflected scanning beams cooperating to define a scanning plane parallel to and spaced from said axis; and said incident beam intersecting a plane perpendicualr to said scanning plane at a point dividing in half a distance between farthest axially displaced mirrors of said assembly.

2. A rotary mirror assembly according to claim 1 wherein each of said mirrors are of identical shape.

3. A rotary mirror assembly according to claim 1 wherein said mirrors are axially spaced apart a distance approximate to an axial dimension of said mirrors.

4. A rotary mirror assembly according to claim 1 wherein said mirrors are helically arranged about said axis of rotation with said light beam generating means disposed with said incident beam presenting an angle of incidence of about 45 degrees on each of said mirror surfaces.

5. A rotary mirror assembly according to claim 1 wherein contiguous mirrors are overlapping.

6. A rotary mirror assembly for dividing a generally continuous incident beam of light into a plurality of parallel spaced apart scanning beams; said assembly comprising:

(a) a plurality of identically shaped plane mirrors;

(b) a rotary body mounted for rotation about an axis of rotation;

(c) means for securing an end of each of said mirrors to said body with said mirrors extending radially away from said axis and presenting mirror surfaces generally perpendicular thereto, said mirrors disposed on said body with adjacent mirrors angularly offset on said axis; each of said mirrors being axially spaced from adjacent mirrors by a same predetermined axial spacing and each of said mirrors covering only an angular segment of a plane perpendicular to said axis with adjacnet mirrors being angularly displaced for a light beam impinging a mirror to leave said mirror as said body rotates and impinge an adjacent mirror;

(d) means for rotating said body; and (e) a source of a generally continuous incident beam of light with said source aligned for said incident beam to project at an angle with said rotational axis and to impinge upon only one mirror of said plurality of mirrors at a time near a radially outer edge of said one mirror and with said incident beam and successively reflected scanning beams cooperating to define a scanning plane parallel to and spaced from said axis; said source further disposed for said incident beam to intersect a plane perpendicualr to said scanning plane at a point dividing in half a distance between farthest axially displaced mirrors of said assembly.

7. A rotary mirror assembly according to claim 6 wherein said mirrors are arranged on said body with adjacent mirrors abutting.

* * * * *